United States Patent
Yang et al.

(10) Patent No.: US 11,144,062 B2
(45) Date of Patent: Oct. 12, 2021

(54) CLEANING AREA SELECTION METHOD AND DEVICE

(71) Applicant: SHEN ZHEN 3IROBOTICS CO., LTD., Guangdong (CN)

(72) Inventors: Yong Yang, Shenzhen (CN); Zexiao Wu, Shenzhen (CN); Yuhui Song, Guangdong (CN)

(73) Assignee: SHEN ZHEN 3IROBOTICS CO., LTD, Shenzhen (CN)

( * ) Notice: Subject to any disclaimer, the term of this patent is extended or adjusted under 35 U.S.C. 154(b) by 0 days.

(21) Appl. No.: 16/753,474

(22) PCT Filed: Dec. 26, 2017

(86) PCT No.: PCT/CN2017/118710
§ 371 (c)(1),
(2) Date: Sep. 30, 2020

(87) PCT Pub. No.: WO2019/104798
PCT Pub. Date: Jun. 6, 2019

(65) Prior Publication Data
US 2021/0011480 A1   Jan. 14, 2021

(30) Foreign Application Priority Data
Nov. 28, 2017   (CN) .......................... 201711212012.0

(51) Int. Cl.
*G05D 1/02*   (2020.01)
*A47L 11/40*   (2006.01)
*B25J 11/00*   (2006.01)

(52) U.S. Cl.
CPC ........ *G05D 1/0219* (2013.01); *A47L 11/4011* (2013.01); *B25J 11/0085* (2013.01); *G05D 2201/0203* (2013.01)

(58) Field of Classification Search
CPC ......... G05D 1/0219; G05D 2201/0203; G05D 1/02; G05D 1/0274; A47L 11/4011; B25J 11/0085; B25J 9/1664
See application file for complete search history.

(56) References Cited

U.S. PATENT DOCUMENTS

| | | | |
|---|---|---|---|
| 2003/0030398 A1* | 2/2003 | Jacobs | G05D 1/0225 318/568.12 |
| 2009/0182464 A1* | 7/2009 | Myeong | G05D 1/0246 701/25 |

(Continued)

FOREIGN PATENT DOCUMENTS

| | | |
|---|---|---|
| CN | 105922267 | 9/2016 |
| CN | 107368079 | 11/2017 |

(Continued)

OTHER PUBLICATIONS

International Search Report and Written Opinion for International application # PCT/CN2017/118710, dated Sep. 7, 2018, pp. 1-5.

(Continued)

*Primary Examiner* — Rachid Bendidi
(74) *Attorney, Agent, or Firm* — Wolter Van Dyke Davis, PLLC; Eugene J. Molinelli; Cian O'Brien

(57) ABSTRACT

Disclosed are a method and device for selecting a to-be-cleaned area. The method includes: obtaining to-be-cleaned secondary selectable area; controlling a floor-cleaning robot to move by one-unit length in first direction and determining whether the current location of floor-cleaning robot is to-be-cleaned secondary selectable area; if no, controlling the floor-cleaning robot to move by one-unit length in second direction and determining whether the current location of floor-cleaning robot is to-be-cleaned secondary selectable area; if no, controlling the floor-cleaning robot to move by two-unit lengths in third direction and determining whether the current location of floor-cleaning robot is to-be-cleaned (Continued)

secondary selectable area; if no, controlling the floor-cleaning robot to move by two-unit lengths in fourth direction and determining whether the current location of floor-cleaning robot is to-be-cleaned secondary selectable area; and executing cleaning operation in to-be-cleaned secondary selectable area if the current location of floor-cleaning robot is the same.

6 Claims, 5 Drawing Sheets

(56) References Cited

U.S. PATENT DOCUMENTS

| | | | | |
|---|---|---|---|---|
| 2016/0302638 | A1* | 10/2016 | Haegermarck | A47L 11/24 |
| 2017/0344013 | A1* | 11/2017 | Haegermarck | G05D 1/0238 |
| 2019/0094870 | A1* | 3/2019 | Afrouzi | G05D 1/0219 |
| 2019/0179325 | A1* | 6/2019 | Deng | A47L 11/4011 |
| 2019/0314991 | A1* | 10/2019 | Liu | B25J 9/1666 |
| 2020/0077860 | A1* | 3/2020 | Lamon | G05D 1/0274 |

FOREIGN PATENT DOCUMENTS

| | | |
|---|---|---|
| JP | 2005230032 | 9/2005 |
| KR | 20050111138 | 11/2005 |

OTHER PUBLICATIONS

Notification of Grant Patent Right for Invention for CN Application No. 201711212012.0, dated Feb. 19, 2019, pp. 1-6.
Office Action for CN Application No. 201711212012.0, dated Oct. 17, 2018, pp. 1-5.
International Search Report and Written Opinion for International application No. PCT/CN2017/118710, dated Sep. 7, 2018, pp. 1-5.
Office Action for CN Application No. 201711212012.0, issued by the Chinese Patent Office dated Oct. 17, 2018, pp. 1-12.

* cited by examiner

CLEANING AREA SELECTION METHOD AND DEVICE

CROSS-REFERENCE TO RELATED APPLICATIONS

This application claims priority to Chinese Patent Application No. 201711212012.0, filed with the Chinese Patent Office on Nov. 28, 2017, entitled "Cleaning Area Selection Method and Device", which is incorporated herein by reference in its entirety.

TECHNICAL FIELD

The present disclosure relates to the field of smart home appliances, and in particular to a method and device for selecting an area to be cleaned.

BACKGROUND ART

With the continuous development of science and technology and the further improvement of people's living standards, floor-cleaning robots have become more and more popular in people's lives. The floor-cleaning robot, also known as an automatic sweeper, a smart vacuum cleaner, a robotic vacuum cleaner, or the like, is a kind of smart household appliances, which can automatically carry out the floor cleaning operation in a room by means of certain artificial intelligence. Generally, the floor-cleaning robot is operated in sweeping and vacuuming modes to suck waste from the ground into its own garbage storage box so as to carry out the function of cleaning the ground.

The prior floor-cleaning robots tend to clean in a disorderly sequence, which often leads to an occurrence of omission of cleaning due to a non-optimal cleaning route of the floor-cleaning robot.

SUMMARY

In view of this, embodiments of the present disclosure provide a method and device for selecting an area to be cleaned.

In one aspect, an embodiment of the present disclosure provides a method for selecting an area to be cleaned, the method comprising: obtaining a secondary selectable area to be cleaned, controlling a floor-cleaning robot to move by one unit length in a first direction, and determining whether a current location of the floor-cleaning robot is a secondary selectable area to be cleaned; if no, controlling the floor-cleaning robot to move by one unit length in a second direction perpendicular to the first direction, and determining whether the current location of the floor-cleaning robot is a secondary selectable area to be cleaned; if no, controlling the floor-cleaning robot to move by two unit lengths in a third direction perpendicular to the second direction and opposite to the first direction, and determining whether the current location of the floor-cleaning robot is a secondary selectable area to be cleaned; if no, controlling the floor-cleaning robot to move by two unit lengths in a fourth direction perpendicular to the third direction and opposite to the second direction, and determining whether the current location of the floor-cleaning robot is a secondary selectable area to be cleaned; and executing a cleaning operation in the secondary selectable area to be cleaned if the current location of the floor-cleaning robot is the secondary selectable area to be cleaned.

In a possible design, the method further comprises: dividing an area to be cleaned into at least two sub-areas to be cleaned; classifying the at least two sub-areas to be cleaned into a large sub-area to be cleaned and a small sub-area to be cleaned according to a size; acquiring a boundary line between the large sub-area to be cleaned and the small sub-area to be cleaned; extending the boundary line and determining whether the extended boundary line can divide the large sub-area to be cleaned; if yes, acquiring a first sub-area to be cleaned that is located on the same side of the boundary line as the small sub-area to be cleaned, and a second sub-area to be cleaned that is located on a different side of the boundary line from the small sub-area to be cleaned; establishing a communication relationship between the small sub-area to be cleaned and the first sub-area to be cleaned, and establishing a communication relationship between the small sub-area to be cleaned and the second sub-area to be cleaned.

In a possible design, the method further comprises: determining whether there is an uncleaned area in a region communicating with the current area, if the cleaning of the current area is completed; if yes, determining whether the current area is a small sub-area to be cleaned; and if yes, selecting an area with the smallest size, for cleaning, from the uncleaned areas communicating with the current area.

In a possible design, after determining whether the current area is a small sub-area to be cleaned, the method further comprises: selecting a nearest area, for cleaning, from the uncleaned areas communicating with the current area, if the current area is not the small sub-area to be cleaned.

In a possible design, the dividing an area to be cleaned into at least two sub-areas to be cleaned comprises: establishing a mapping relationship between the area to be cleaned and a grid map; acquiring a certain uncleaned grid in the area to be cleaned, using the grid as a seed point, and using an area where the seed point is located as a first sub-area to be cleaned; acquiring a column where the seed point is located, and determining whether the column has an uncleaned grid corresponding to the grid map, and if yes, adding the grid to the first sub-area to be cleaned; acquiring an adjacent column adjacent to the current column, and determining whether the adjacent column has an uncleaned grid corresponding to the grid map, and if yes, adding the grid to the first sub-area to be cleaned; and repeating the step of "acquiring an adjacent column adjacent to the current column, and determining whether the adjacent column has an uncleaned grid corresponding to the grid map, and if yes, adding the grid to the first sub-area to be cleaned" until there is no uncleaned grid so as to complete the establishment of the first sub-area to be cleaned.

In a possible design, after determining whether there is an uncleaned area in a region communicating with the current area, the method further comprises: returning to a previous area previous to the current area and using the previous area as a new current area if there is no uncleaned area in the region communicating with the current area.

In another aspect, an embodiment of the present disclosure further provides a device for selecting an area to be cleaned, the device comprising: a secondary selectable area obtaining module, configured to obtain a secondary selectable area to be cleaned; a first direction moving module, configured to control a floor-cleaning robot to move by one unit length in a first direction, and determine whether a current location of the floor-cleaning robot is a secondary selectable area to be cleaned; a second direction moving module, configured to control the floor-cleaning robot to move by one unit length in a second direction perpendicular to the first direction, and determine whether the current location of the floor-cleaning robot is a secondary selectable area to be cleaned; a third direction moving module, configured to control the floor-cleaning robot to move by two unit lengths in a third direction perpendicular to the second direction and opposite to the first direction, and determine whether the current location of the floor-cleaning robot is a secondary selectable area to be cleaned; a fourth direction moving module, configured to control the floor-cleaning robot to move by two unit lengths in a fourth direction perpendicular to the third direction and opposite to the second direction, and determine whether the current location of the floor-cleaning robot is a secondary selectable area to be cleaned; and a cleaning execution module, configured to execute a cleaning operation in the secondary selectable area to be cleaned if the current location of the floor-cleaning robot is the secondary selectable area to be cleaned.

In a possible design, the device further comprises: a sub-area initial division module, configured to divide an area to be cleaned into at least two sub-areas to be cleaned; a size distinguishing module, configured to classify the at least two sub-areas to be cleaned into a large sub-area to be cleaned and a small sub-area to be cleaned according to a size; a boundary line acquisition module, configured to acquire a boundary line between the large sub-area to be cleaned and the small sub-area to be cleaned; a boundary line dividing module, configured to extend the boundary line and determine whether the extended boundary line can divide the large sub-area to be cleaned; a sub-area sub-dividing module, configured to acquire a first sub-area to be cleaned that is located on the same side of the boundary line as the small sub-area to be cleaned, and a second sub-area to be cleaned that is located on a different side of the boundary line from the small sub-area to be cleaned; and a module for selecting an area to be cleaned, configured to establish a communication relationship between the small sub-area to be cleaned and the first sub-area to be cleaned, and establish a communication relationship between the small sub-area to be cleaned and the second sub-area to be cleaned.

In a possible design, the device further comprises: an uncleaned area determining module, configured to determine whether there is an uncleaned area in a region communicating with the current area; a small sub-area determining module, configured to determine whether the current area is a small sub-area to be cleaned; and a size selection module, configured to select an area with the smallest size, for cleaning, from the uncleaned areas communicating with the current area.

In a possible design, the device further comprises: a distance selection module, configured to select a nearest area, for cleaning, from the uncleaned areas communicating with the current area.

In a possible design, the sub-area initial division module comprises: a mapping relationship establishing submodule, configured to establish a mapping relationship between the area to be cleaned and a grid map; a seed point acquisition submodule, configured to acquire a certain uncleaned grid in the area to be cleaned, use the grid as a seed point, and use an area where the seed point is located as a first sub-area to be cleaned; an uncleaned grid submodule, configured to acquire a column where the seed point is located, and determine whether the column has an uncleaned grid corresponding to the grid map, and if yes, add the grid to the first sub-area to be cleaned; an adjacent column determining submodule, configured to acquire an adjacent column adjacent to the current column, and determine whether the adjacent column has an uncleaned grid corresponding to the grid map, and if yes, add the grid to the first sub-area to be cleaned; and an area establishment completing submodule, configured to repeat the step of "acquiring an adjacent column adjacent to the current column, and determining whether the adjacent column has an uncleaned grid corresponding to the grid map, and if yes, adding the grid to the first sub-area to be cleaned" until there is no uncleaned grid so as to complete the establishment of the first sub-area to be cleaned.

In a possible design, the device further comprises: an area returning module, configured to return to a previous area previous to the current area and use the previous area as a new current area if there is no uncleaned area in the region communicating with the current area.

In still another aspect, an embodiment of the present disclosure provides a computer readable storage medium, configured to store computer instructions configured to execute a program corresponding to the method described above.

In still another aspect, an embodiment of the present disclosure provides an electronic apparatus, comprising a processor and a computer readable storage medium configured to store computer instructions, wherein a program corresponding to the method described above is executed when the computer instructions are read and run by the processor.

In still another aspect, an embodiment of the present disclosure further provides another electronic apparatus, the electronic apparatus comprising:

a memory;

a processor; and a device for selecting an area to be cleaned, wherein the device is installed in the memory and comprises one or more software functional modules executed by the processor, the device for selecting an area to be cleaned comprises:

a secondary selectable area obtaining module, configured to obtain a secondary selectable area to be cleaned;

a first direction moving module, configured to control a floor-cleaning robot to move by one unit length in a first direction, and determine whether the current location of the floor-cleaning robot is a secondary selectable area to be cleaned;

a second direction moving module, configured to control the floor-cleaning robot to move by one unit length in a second direction perpendicular to the first direction, and determine whether the current location of the floor-cleaning robot is a secondary selectable area to be cleaned;

a third direction moving module, configured to control the floor-cleaning robot to move by two unit lengths in a third direction perpendicular to the second direction and opposite to the first direction, and determine whether the current location of the floor-cleaning robot is a secondary selectable area to be cleaned;

a fourth direction moving module, configured to control the floor-cleaning robot to move by two unit lengths in a fourth direction perpendicular to the third direction and opposite to the second direction, and determine whether the current location of the floor-cleaning robot is a secondary selectable area to be cleaned; and a cleaning execution module, configured to execute a cleaning operation in the secondary selectable area to be cleaned if the current location of the floor-cleaning robot is the secondary selectable area to be cleaned.

In a possible design, the electronic apparatus may be a floor-cleaning robot or a server.

In the method and device for selecting an area to be cleaned according to the embodiments of the present disclosure, a secondary selectable area to be cleaned is obtained, a floor-cleaning robot is controlled to move by one unit length in a first direction, and it is determined whether the current location of the floor-cleaning robot is a secondary selectable area to be cleaned; if no, the floor-cleaning robot is controlled to move by one unit length in a second direction perpendicular to the first direction, and it is determined whether the current location of the floor-cleaning robot is a secondary selectable area to be cleaned; if no, the floor-cleaning robot is controlled to move by two unit lengths in a third direction perpendicular to the second direction and opposite to the first direction, and it is determined whether the current location of the floor-cleaning robot is a secondary selectable area to be cleaned; if no, the floor-cleaning robot is controlled to move by two unit lengths in a fourth direction perpendicular to the third direction and opposite to the second direction, and it is determined whether the current location of the floor-cleaning robot is a secondary selectable area to be cleaned; if the current location of the floor-cleaning robot is a secondary selectable area to be cleaned, a cleaning operation is executed in the secondary selectable area to be cleaned. In the present disclosure, an area to be cleaned is selected by determining, multiple times, whether an area where the floor-cleaning robot is located is a secondary selectable area to be cleaned, and the floor-cleaning robot moves by a shorter unit distance, so that a better coverage of the area to be cleaned can be achieved, and the occurrence of omission of cleaning can be avoided.

BRIEF DESCRIPTION OF DRAWINGS

In order to more clearly illustrate technical solutions of embodiments of the present disclosure or of the prior art, drawings required for use in the description of the embodiments or the prior art will be described briefly below. It is apparent that the drawings in the following description are merely illustrative of some embodiments of the present disclosure. It will be understood by those of ordinary skill in the art that other drawings can also be obtained from these drawings without any inventive effort.

DETAILED DESCRIPTION OF EMBODIMENTS

First Embodiment

Figure 1:
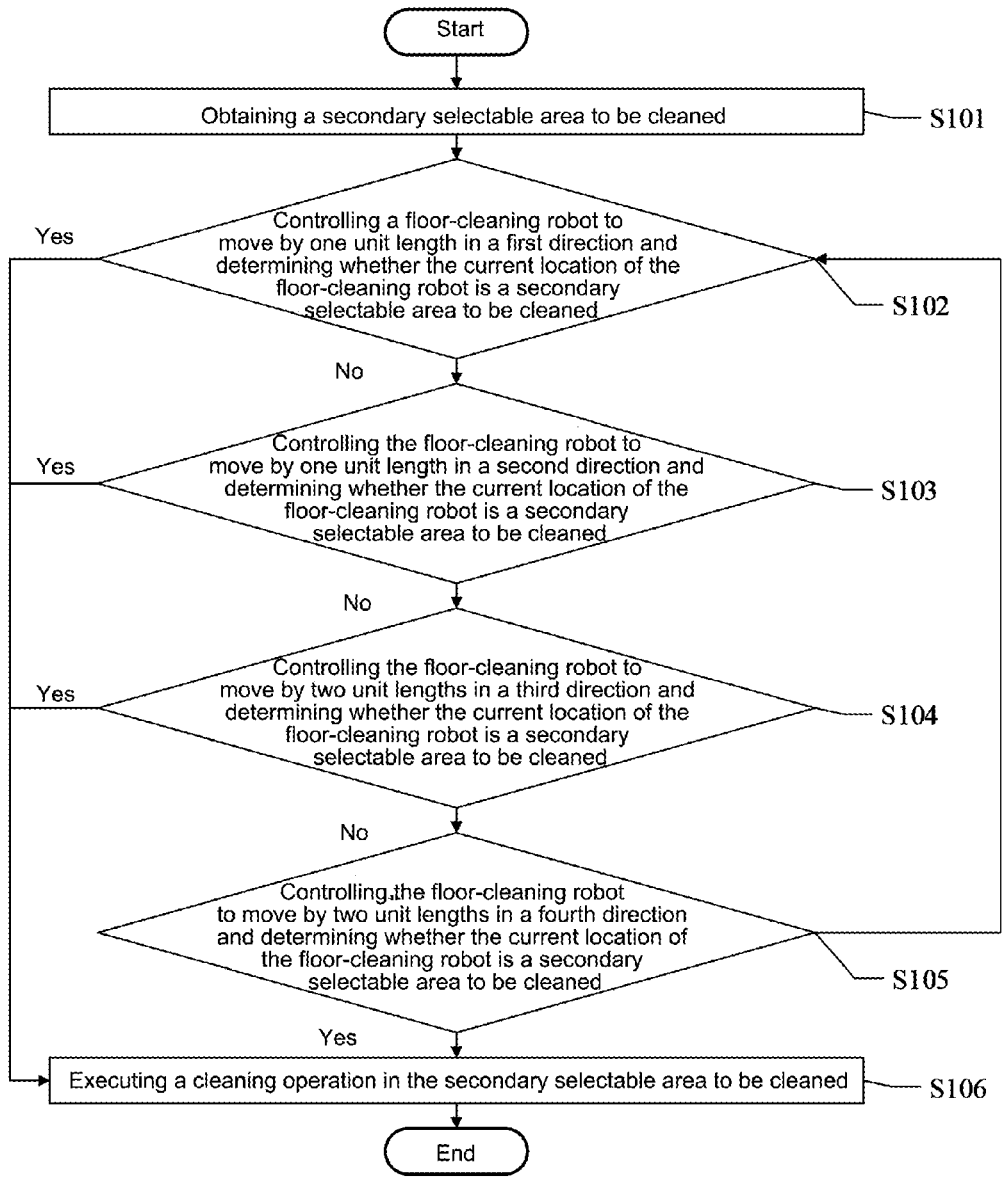
FIG. 1 is a schematic flowchart of a method for selecting an area to be cleaned according to a first embodiment of the present disclosure.

Referring to FIG. 1, FIG. 1 illustrates a schematic flowchart of a method for selecting an area to be cleaned according to the present disclosure. The method specifically comprises the following steps:

In step S101, a secondary selectable area to be cleaned is obtained.

Specifically, the secondary selectable area to be cleaned may be obtained after an entire area to be cleaned is drawn and processed by a floor-cleaning robot, or may be sent from a server to the floor-cleaning robot after it is processed by the server.

In step S102, the floor-cleaning robot is controlled to move by one unit length in a first direction, and it is determined whether the current location of the floor-cleaning robot is a secondary selectable area to be cleaned, and if no, step S103 is executed.

Figure 9:
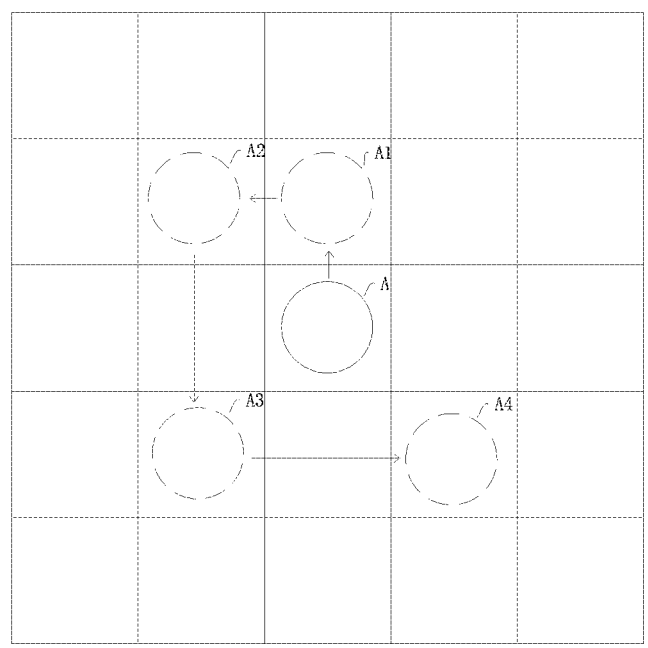
FIG. 9 is a schematic flowchart showing a movement of the floor-cleaning robot during selection of an area to be cleaned.

Referring to FIG. 9, when the floor-cleaning robot moves from the location A to the location A1 in the figure, it can be considered that the floor-cleaning robot has moved by one unit length in a first direction, where one unit length refers to a side length of one grid. At this time, it is determined whether the location A1 where the floor-cleaning robot is located is a secondary selectable area to be cleaned, and if yes, the execution of the following steps may be stopped, and the floor-cleaning robot is controlled to clean the secondary selectable area to be cleaned.

In step S103, the floor-cleaning robot is controlled to move by one unit length in a second direction, and it is determined whether the current location of the floor-cleaning robot is a secondary selectable area to be cleaned, and if no, step S104 is executed.

Referring to FIG. 9, when the floor-cleaning robot moves from the location A1 to the location A2 in the figure, it can be considered that the floor-cleaning robot has moved by one unit length in a second direction, where one unit length refers to the side length of one grid, and the second direction is perpendicular to the first direction. At this time, it is determined whether the location A2 where the floor-cleaning robot is located is a secondary selectable area to be cleaned, and if yes, the execution of the following steps may be stopped, and the floor-cleaning robot is controlled to clean the secondary selectable area to be cleaned.

In step S104, the floor-cleaning robot is controlled to move by two unit lengths in a third direction, and it is determined whether the current location of the floor-cleaning robot is a secondary selectable area to be cleaned, and if no, step S105 is executed.

Referring to FIG. 9, when the floor-cleaning robot moves from the location A2 to the location A3 in the figure, it can be considered that the floor-cleaning robot has moved by two unit lengths in a third direction, where the third direction is perpendicular to the second direction, and the third direction is opposite to the first direction. At this time, it is determined whether the location A3 where the floor-cleaning robot is located is a secondary selectable area to be cleaned, and if yes, the execution of the following steps may be stopped, and the floor-cleaning robot is controlled to clean the secondary selectable area to be cleaned.

In step S105, the floor-cleaning robot is controlled to move by two unit lengths in a fourth direction, and it is determined whether the current location of the floor-cleaning robot is a secondary selectable area to be cleaned, and if yes, step S106 is executed.

Referring to FIG. 9, when the floor-cleaning robot moves from the location A3 to the location A4 in the figure, it can be considered that the floor-cleaning robot has moved by two unit lengths in a fourth direction, where the fourth direction is perpendicular to the third direction and opposite to the second direction. At this time, it is determined whether the location A4 where the floor-cleaning robot is located is a secondary selectable area to be cleaned, and if yes, the execution of the following steps may be stopped, and the floor-cleaning robot is controlled to clean the secondary selectable area to be cleaned.

In step S106, a cleaning operation is executed in the secondary selectable area to be cleaned.

During the running process, if an area where the floor-cleaning robot is located is a secondary selectable area to be cleaned, the floor-cleaning robot may be controlled to perform a cleaning operation in the area where the floor-cleaning robot is located.

In the present disclosure, an area to be cleaned is selected by determining, multiple times, whether an area where the floor-cleaning robot is located is a secondary selectable area to be cleaned, and the floor-cleaning robot moves by a shorter unit distance, so that a better coverage of the area to be cleaned can be achieved, and the occurrence of omission of cleaning can be avoided.

Figure 2:
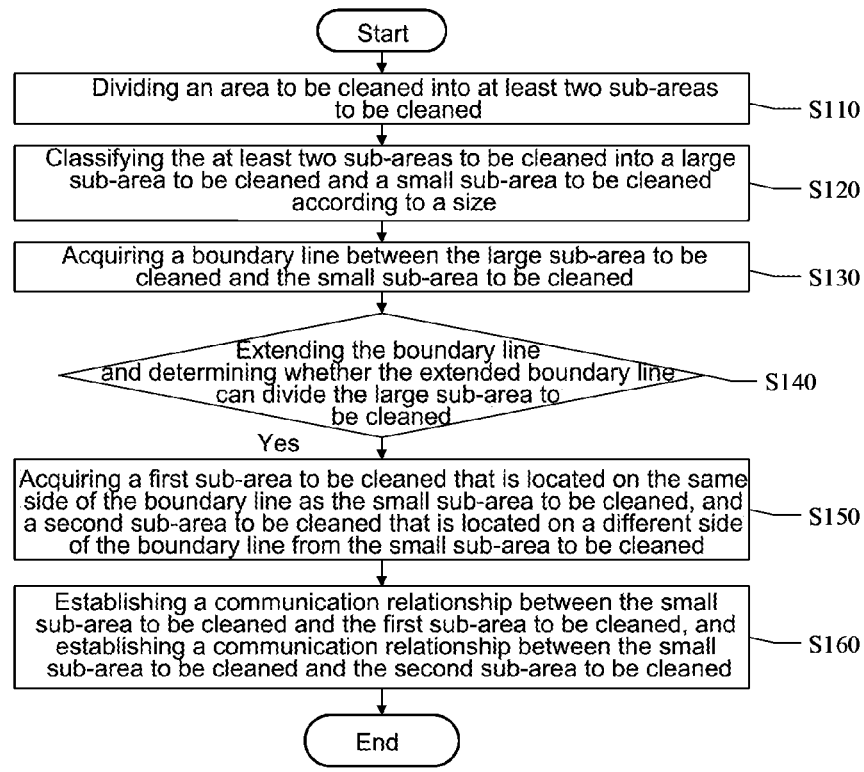
FIG. 2 is a schematic flowchart of a method for selecting an area to be cleaned according to the first embodiment of the present disclosure.

Referring to FIG. 2, FIG. 2 illustrates a schematic flowchart of a method for selecting an area to be cleaned according to the first embodiment of the present disclosure. Optionally, the method specifically comprises the following steps:

In step S110, the area to be cleaned is divided into at least two sub-areas to be cleaned.

Figure 6:
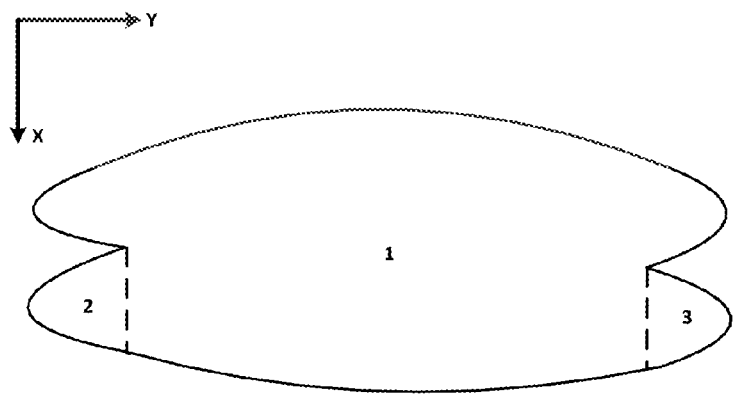
FIG. 6 is a schematic view showing an application scenario for a first division of an area to be cleaned.

Referring to FIG. 6, the area to be cleaned may be specifically divided into sub-areas to be cleaned which are numbered 1, 2, and 3 as shown in FIG. 6. The division of the area is executed after the floor-cleaning robot has cleaned the edge of the entire area to be cleaned. The step of dividing the area to be cleaned may be performed in a controller of the floor-cleaning robot, or may be uploaded from the floor-cleaning robot to the server so as to be performed in the server.

Figure 4:
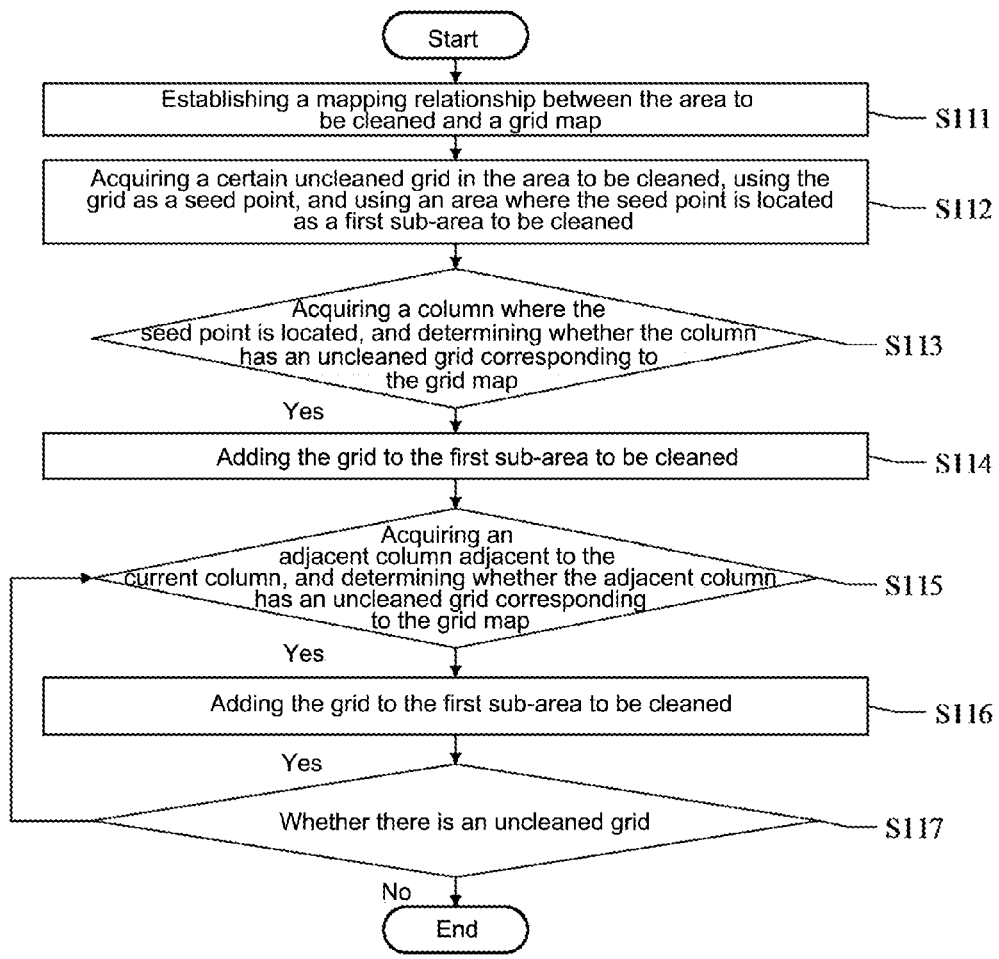
FIG. 4 is a schematic view showing specific steps of step S110 in FIG. 2.

Referring to FIG. 4, optionally, the step S110 may specifically comprise the following steps:

In step S111, a mapping relationship between the area to be cleaned and a grid map is established.

The area to be cleaned as shown in FIG. 6 may be overlapped with a grid map, where the grid map refers to a checkerboard-shaped rectangular pattern made up of multiple equally dimensioned grids. When the area to be cleaned is overlapped with the grid map, multiple grids in the grid map may divide the area to be cleaned into multiple square areas having the same dimension as the grids.

In step S112, a certain uncleaned grid in the area to be cleaned is acquired and used as a seed point, and an area where the seed point is located is used as a first sub-area to be cleaned.

A grid that has not been cleaned by the floor-cleaning robot is randomly selected from the area to be cleaned, that is to say, a non-edge location in the area to be cleaned is selected, and used as a seed point, and an area where the seed point is located may be used as a first sub-area to be cleaned.

In this case, it is necessary to divide the entire area to be cleaned, so that a seed point may be first randomly selected from the area to be cleaned, thereby distinguishing between a first sub-area to be cleaned where the seed point is located and a sub-area to be cleaned where the seed point does not exist.

In step S113, a column where the seed point is located is acquired, and it is determined whether the column has an uncleaned grid corresponding to the grid map, and if yes, step S114 is executed.

A column where the seed point is located is acquired according to the grid map, and it is determined whether the column has a grid that has not been cleaned by the floor-cleaning robot during cleaning along the edge, and if yes, step S114 is executed.

In step S114, the grid is added to the first sub-area to be cleaned.

All the uncleaned grids in the column where the seed point is located are added to the first sub-area to be cleaned where the seed point is located.

In step S115, an adjacent column adjacent to the current column is acquired, and it is determined whether the adjacent column has an uncleaned grid corresponding to the grid map, and if yes, step S116 is executed.

After the column where the seed point is located has been classified, a column on the left side of or a column on the right side of the column where the seed point is located may be acquired, and it is also determined whether the adjacent column has a grid that has not been cleaned by the floor-cleaning robot, and if yes, step S116 is executed, wherein either the column on the left side of or the column on the right side of the column where the seed point is located is possible, and the specific direction should not be construed as limiting the present disclosure.

In step S116, the grid is added to the first sub-area to be cleaned.

After it is determined that the adjacent column has grids that have not been cleaned by the floor-cleaning robot, the multiple uncleaned grids in the adjacent column are acquired, and the multiple grids are all added to the first sub-area to be cleaned.

In step S117, it is determined whether there is an uncleaned grid, and if yes, the step S115 is executed.

It is determined whether the first sub-area to be cleaned still has a grid that has not been cleaned and is omitted, and if yes, the process skips to the step S115 to acquire a column adjacent to the current column, wherein the current column may be a column adjacent to the column where the seed point is located. Thus, the columns on both sides of the column where the seed point is located are traversed to complete the establishment of the first sub-area to be cleaned.

In addition, optionally, after the establishment of the first sub-area to be cleaned is finished, a seed point is randomly selected again from an area not included in the first sub-area to be cleaned of the area to be cleaned, and the step of acquiring a column where the seed point is located, and determining whether the column where the seed point is located has an uncleaned grid corresponding to the grid map, and if yes, adding the grid to the first sub-area to be cleaned, and the subsequent steps are re-executed until the division of the area to be cleaned is completed.

Specifically, after the establishment of the first sub-area to be cleaned is completed, a seed point may be randomly selected again from an area not included in the first sub-area to be cleaned, and step S113 to step S117 are continuedly executed to complete the division of the area to be cleaned. An effect diagram showing the division of the area to be cleaned, that is obtained after the step S117 is ended, may be seen in FIG. 6, in which 1, 2, and 3 represent the divided three sub-areas to be cleaned, respectively.

In step S120, the at least two sub-areas to be cleaned are classified into a large sub-area to be cleaned and a small sub-area to be cleaned according to the size.

The divided sub-areas to be cleaned are recorded in a memory of the floor-cleaning robot, and the floor-cleaning robot may classify the respective sub-areas to be cleaned into a large sub-area to be cleaned and a small sub-area to be cleaned according to the sizes of the respective sub-areas to be cleaned. For example, taking FIG. 6 as an example, the areas 2 and 3 in the figure are classified as small sub-areas to be cleaned, and the area 1 in the figure is classified as a large sub-area to be cleaned.

In step S130, a boundary line between the large sub-area to be cleaned and the small sub-area to be cleaned is acquired.

As shown in FIG. 6, the boundary line may be a dotted line between the area represented by 1 and the area represented by 2, or a dotted line between the area represented by 1 and the area represented by 3.

In step S140, the boundary line is extended, and it is determined whether the extended boundary line can divide the large sub-area to be cleaned, and if yes, step S150 is executed.

The boundary line is extended, and it is determined whether the extended boundary line can further divide the large sub-area to be cleaned, and if yes, step S150 is executed.

In step S150, a first sub-area to be cleaned, that is located on the same side of the boundary line as the small sub-area to be cleaned, and a second sub-area to be cleaned, that is located on a different side of the boundary line from the small sub-area to be cleaned, are acquired.

Figure 7:
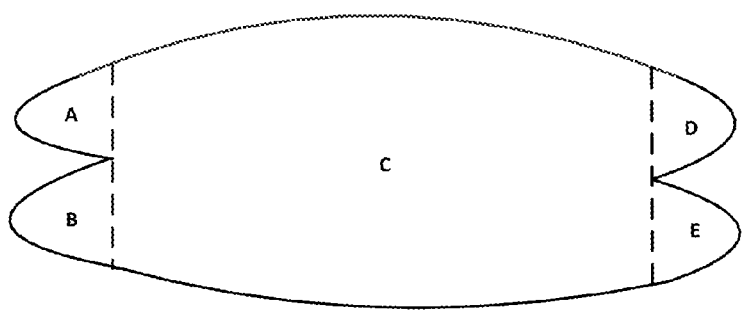
FIG. 7 is a schematic view showing an application scenario for a second division of the area to be cleaned.

Referring to FIG. 7, FIG. 7 illustrates a schematic effect diagram showing the area to be cleaned that is further divided by the boundary lines. After the boundary line between the area where the number "2" is located in FIG. 6 (i.e., an area where B is located in FIG. 7) and the area where the number "1" is located in FIG. 6 is extended, the area where the number "1" is located in FIG. 6 is divided into an area where A is located in FIG. 7 and an area where C is located in FIG. 7; and after the boundary line between the area where the number "3" is located in FIG. 6 (i.e., an area where E is located in FIG. 7) and the area where the number "1" is located in FIG. 6 is extended, the area where the number "1" is located in FIG. 6 is divided into an area where D is located in FIG. 7 and an area where C is located in FIG. 7.

Here, the area where A is located in FIG. 7 is a first sub-area to be cleaned that is located on the same side of the boundary line as the area where B is located in FIG. 7, and the area where C is located in FIG. 7 is a second sub-area to be cleaned that is located on a different side of the boundary line from the area where B is located in FIG. 7.

Similarly, the area where D is located in FIG. 7 is a first sub-area to be cleaned that is located on the same side of the boundary line as the area where E is located in FIG. 7, and the area where C is located in FIG. 7 is a second sub-area to be cleaned that is located on a different side of the boundary line from the area where E is located in FIG. 7.

In step S160, a communication relationship between the small sub-area to be cleaned and the first sub-area to be cleaned is established, and a communication relationship between the small sub-area to be cleaned and the second sub-area to be cleaned is established.

A communication relationship between the small sub-area to be cleaned and the first sub-area to be cleaned is established, and a communication relationship between the small sub-area to be cleaned and the second sub-area to be cleaned is established, that is to say, in FIG. 7, a communication relationship between the area where B is located and the area where A is located and a communication relationship between the area where B is located and the area where C is located are established.

Figure 3:
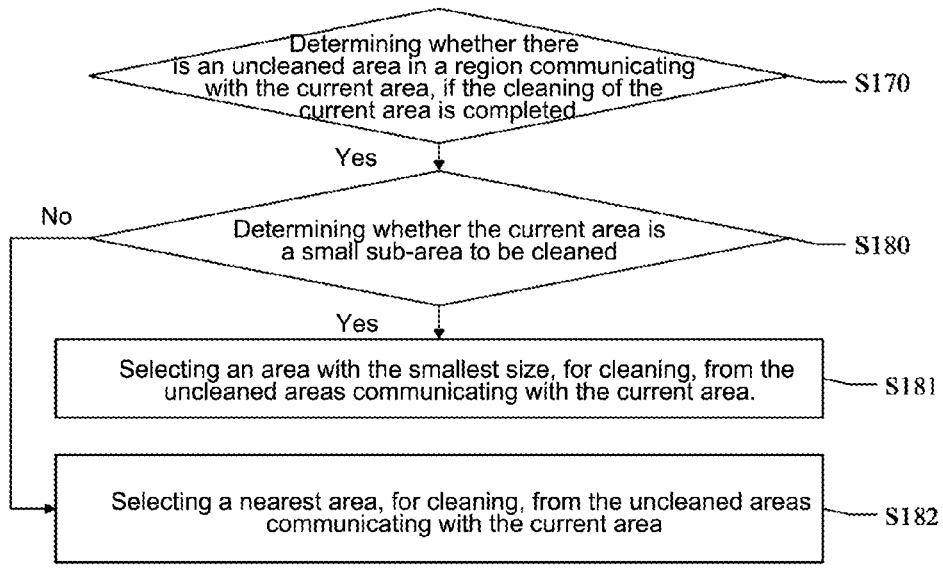
FIG. 3 is a schematic partial flowchart of a method for selecting an area to be cleaned according to the first embodiment of the present disclosure.

Referring to FIG. 3, FIG. 3 illustrates a schematic partial flowchart of a method for selecting an area to be cleaned according to an embodiment of the present disclosure. Optionally, the method specifically comprises the following steps:

In step S170, if the cleaning of the current area is completed, it is determined whether there is an uncleaned area in a region communicating with the current area, and if yes, step S180 is executed.

When the floor-cleaning robot is located in the area where A is located, and when the floor-cleaning robot completes the operation of cleaning the area where A is located, it is determined whether there is an uncleaned area in a region communicating with the area where A is located. It can be seen from steps S110 to S160 that the region in communication with the area where A is located only includes the area where B is located, therefore it may be determined whether the area where B is located has been cleaned, and if the area where B is located has not been cleaned, step S180 is executed.

Specifically, if there is no uncleaned area in the region communicating with the current area, the floor-cleaning robot returns to a previous area previous to the current area, and the previous area is used as a new current area.

For example, for the area where A is located, the region in communication with the area where A is located only includes the area where B is located. If the area where B is located has already been cleaned, there is no uncleaned area. At this time, the floor-cleaning robot returns to an area previous to the area where A is located, that is, the area where B is located, and the area where B is located is used as a new current area.

In step S180, it is determined whether the current area is a small sub-area to be cleaned, and if yes, step S181 is executed; and if no, step S182 is executed.

It may be determined whether the current area is a small sub-area to be cleaned, and a corresponding cleaning strategy to be executed in the uncleaned area communicating with the current area is determined according to the type of the current area.

In step S181, an area with the smallest size is selected to be cleaned from the uncleaned areas communicating with the current area.

For example, if the current area is a small sub-area to be cleaned, an area with the smallest size is selected to be cleaned from the uncleaned areas communicating with the current area. For the area where A is located, if the area where B is located has not been cleaned and B is the only area communicating with A, the floor-cleaning robot selects the area where B is located to perform a cleaning action.

In step S182, a nearest area is selected to be cleaned from the uncleaned areas communicating with the current area.

If the current area is a large sub-area to be cleaned, a nearest area may be selected to be cleaned from the uncleaned areas communicating with the current area.

Specifically, referring to FIG. 7, for the area where C is located, the region communicating with C includes the area where B is located and the area where E is located. If one of the two areas has been cleaned and the other has not been cleaned, the floor-cleaning robot goes to and cleans the area that has not been cleaned; and if both have not been cleaned, the floor-cleaning robot goes to and cleans the area nearer to the current location.

Referring to FIG. 7, in a specific embodiment, if the floor-cleaning robot is initially located in the area where B is located (hereinafter simply referred to as "area B"), and none of the areas where A, C, D, and E are located (hereinafter simply referred to as "areas A, C, D, and E") has been cleaned, the floor-cleaning robot executes the cleaning task in accordance with the following procedures:

An operation of cleaning the area B is completed first, the area A and the area C communicating with the area B are acquired, and it is determined whether the area A and the area C have been cleaned. Since both the area A and the area C have not been cleaned and the area B is a small sub-area to be cleaned, the floor-cleaning robot selects the area A with a smaller size, for cleaning, from the area A and the area C.

After the operation of cleaning the area A is completed, the area B communicating with the area A is acquired, and it is determined whether the area B has been cleaned. Since the area B has already been cleaned, the floor-cleaning robot returns back to an area previous to the area A, that is, the area B, and the area B is used as a new current area.

At this time, for the area B, the area A communicating with the area B has already been cleaned, and the area C has not been cleaned, thus the floor-cleaning robot goes to the area C to execute the cleaning operation.

After the operation of cleaning the area C is completed, the area B and the area E communicating with the area C are acquired. Since the area B has already been cleaned and the area E has not been cleaned, the floor-cleaning robot goes to the area E to execute the cleaning operation.

After the operation of cleaning the area E is completed, the area C and the area D communicating with the area E are acquired. Since the area C has already been cleaned and the area D has not been cleaned, the floor-cleaning robot goes to the area D to execute the cleaning operation.

At this point, the floor-cleaning robot has completed the operation of cleaning all the areas including the areas A, B, C, D, and E.

Figure 8:
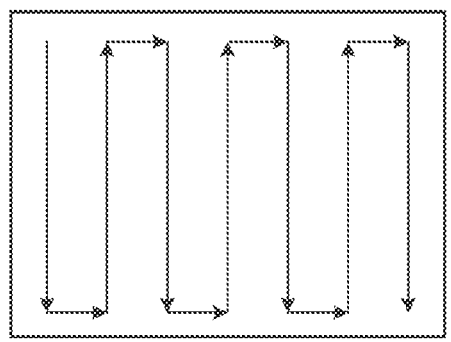
FIG. 8 is a schematic view showing a direction in which a floor-cleaning robot cleans an area to be cleaned.

When the floor-cleaning robot needs to execute a cleaning operation, the cleaning operation may be performed in a zigzag manner as shown in FIG. 8. Specifically, end points of each column in the sub-area to be cleaned may be obtained according to the grid map, and the end points of the same column are used as paired coverage points, and zigzag cleaning is implemented according to the paired coverage points.

In the method for selecting an area to be cleaned according to the first embodiment of the present disclosure, the entire area to be cleaned is divided, and communication relationships between the respective sub-areas are established according to the dividing process, so that the robot can execute a cleaning task according to the communication relationships between the respective sub-areas. Compared with the prior art, the sub-areas are divided more scientifically, and a more comprehensive cleaning scheme can be executed with a shorter path.

Second Embodiment

Figure 5:
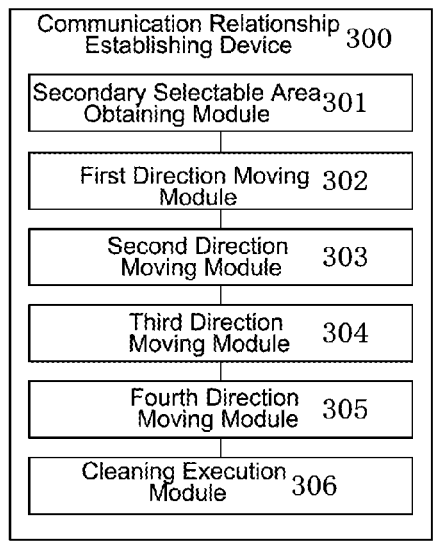
FIG. 5 is a structural block diagram of a device for selecting an area to be cleaned according to a second embodiment of the present disclosure.

Referring to FIG. 5, FIG. 5 illustrates a schematic structural diagram of a device for selecting an area to be cleaned according to an embodiment of the present disclosure. The device 300 comprises:

a secondary selectable area obtaining module 301, configured to obtain a secondary selectable area to be cleaned;

a first direction moving module 302, configured to control a floor-cleaning robot to move by one unit length in a first direction, and determine whether the current location of the floor-cleaning robot is a secondary selectable area to be cleaned;

a second direction moving module 303, configured to control the floor-cleaning robot to move by one unit length in a second direction perpendicular to the first direction, and determine whether the current location of the floor-cleaning robot is a secondary selectable area to be cleaned;

a third direction moving module 304, configured to control the floor-cleaning robot to move by two unit lengths in a third direction perpendicular to the second direction and opposite to the first direction, and determine whether the current location of the floor-cleaning robot is a secondary selectable area to be cleaned;

a fourth direction moving module 305, configured to control the floor-cleaning robot to move by two unit lengths in a fourth direction perpendicular to the third direction and opposite to the second direction, and determine whether the current location of the floor-cleaning robot is a secondary selectable area to be cleaned; and a cleaning execution module 306, configured to execute a cleaning operation in the secondary selectable area to be cleaned if the current location of the floor-cleaning robot is the secondary selectable area to be cleaned.

A sub-area initial division module is configured to divide an area to be cleaned into at least two sub-areas to be cleaned.

A mapping relationship establishing submodule is configured to establish a mapping relationship between the area to be cleaned and a grid map.

A seed point acquisition submodule is configured to acquire a certain uncleaned grid in the area to be cleaned, use the grid as a seed point, and use an area where the seed point is located as a first sub-area to be cleaned.

An uncleaned grid submodule is configured to acquire a column where the seed point is located, and determine whether the column has an uncleaned grid corresponding to the grid map, and if yes, add the grid to the first sub-area to be cleaned.

An adjacent column determining submodule is configured to acquire an adjacent column adjacent to the current column, and determine whether the adjacent column has an uncleaned grid corresponding to the grid map, and if yes, add the grid to the first sub-area to be cleaned.

An area establishment completing submodule is configured to repeat the step of "acquiring an adjacent column adjacent to the current column, and determining whether the adjacent column has an uncleaned grid corresponding to the grid map, and if yes, adding the grid to the first sub-area to be cleaned" until there is no uncleaned grid so as to complete the establishment of the first sub-area to be cleaned.

In addition, the seed point acquisition submodule is further configured to: randomly select, after the establishment of the first sub-area to be cleaned is finished, a seed point from an area not included in the first sub-area to be cleaned of the area to be cleaned, and re-execute the step of acquiring a column where the seed point is located, and determining whether the column where the seed point is located has an uncleaned grid corresponding to the grid map, and if yes, adding the grid to the first sub-area to be cleaned and the subsequent steps until the division of the area to be cleaned is completed.

A size distinguishing module is configured to classify the at least two sub-areas to be cleaned into a large sub-area to be cleaned and a small sub-area to be cleaned according to a size.

A boundary line acquisition module is configured to acquire a boundary line between the large sub-area to be cleaned and the small sub-area to be cleaned.

A boundary line dividing module is configured to extend the boundary line and determine whether the extended boundary line can divide the large sub-area to be cleaned.

A sub-area sub-dividing module is configured to acquire a first sub-area to be cleaned that is located on the same side of the boundary line as the small sub-area to be cleaned, and a second sub-area to be cleaned that is located on a different side of the boundary line from the small sub-area to be cleaned.

A module for selecting an area to be cleaned is configured to establish a communication relationship between the small sub-area to be cleaned and the first sub-area to be cleaned, and establish a communication relationship between the small sub-area to be cleaned and the second sub-area to be cleaned.

The cleaning execution module is configured to obtain end points of each column in the sub-area to be cleaned according to the grid map, use the end points of the same column as paired coverage points, and implement zigzag cleaning according to the paired coverage points.

The device further comprises: an uncleaned area determining module, configured to determine whether there is an uncleaned area in a region communicating with the current area;

a small sub-area determining module, configured to determine whether the current area is a small sub-area to be cleaned;

a size selection module, configured to select an area with the smallest size, for cleaning, from the uncleaned areas communicating with the current area;

a distance selection module, configured to select a nearest area, for cleaning, from the uncleaned areas communicating with the current area; and an area returning module, configured to return to a previous area previous to the current area and use the previous area as a new current area if there is no uncleaned area in the region communicating with the current area.

Third Embodiment

The embodiment of the present disclosure further provides a computer readable storage medium, wherein computer instructions are stored in the computer readable storage medium, and the method as described in the first embodiment is executed when the computer instructions are run.

Fourth Embodiment

The embodiment of the present disclosure provides an electronic apparatus, comprising a processor and a computer readable storage medium, wherein the computer readable storage medium is configured to store computer instructions, wherein a program corresponding to the method described above is executed when the computer instructions are read and run by the processor.

Fifth Embodiment

The embodiment of the present disclosure provides another electronic apparatus, the electronic apparatus comprising:
a memory;
a processor; and
a device for selecting an area to be cleaned, wherein the device is installed in the memory and comprises one or more software functional modules executed by the processor, the device for selecting an area to be cleaned comprises:
a secondary selectable area obtaining module, configured to obtain a secondary selectable area to be cleaned;

a first direction moving module, configured to control a floor-cleaning robot to move by one unit length in a first direction, and determine whether the current location of the floor-cleaning robot is a secondary selectable area to be cleaned;

a second direction moving module, configured to control the floor-cleaning robot to move by one unit length in a second direction perpendicular to the first direction, and determine whether the current location of the floor-cleaning robot is a secondary selectable area to be cleaned;

a third direction moving module, configured to control the floor-cleaning robot to move by two unit lengths in a third direction perpendicular to the second direction and opposite to the first direction, and determine whether the current location of the floor-cleaning robot is a secondary selectable area to be cleaned;

a fourth direction moving module, configured to control the floor-cleaning robot to move by two unit lengths in a fourth direction perpendicular to the third direction and opposite to the second direction, and determine whether the current location of the floor-cleaning robot is a secondary selectable area to be cleaned; and a cleaning execution module, configured to execute a cleaning operation in the secondary selectable area to be cleaned if the current location of the floor-cleaning robot is the secondary selectable area to be cleaned.

Optionally, the electronic apparatus may be a floor-cleaning robot or a server.

It will be clearly appreciated by those skilled in the art that, for convenience and brevity of the description, specific operating processes of the device described above may be performed with reference to the corresponding processes in the foregoing method and will not be described unduly herein.

In the method and device for selecting an area to be cleaned according to the embodiments of the present disclosure, a secondary selectable area to be cleaned is obtained, a floor-cleaning robot is controlled to move by one unit length in a first direction, and it is determined whether the current location of the floor-cleaning robot is a secondary selectable area to be cleaned; if no, the floor-cleaning robot is controlled to move by one unit length in a second direction perpendicular to the first direction, and it is determined whether the current location of the floor-cleaning robot is a secondary selectable area to be cleaned; if no, the floor-cleaning robot is controlled to move by two unit lengths in a third direction perpendicular to the second direction and opposite to the first direction, and it is determined whether the current location of the floor-cleaning robot is a secondary selectable area to be cleaned; if no, the floor-cleaning robot is controlled to move by two unit lengths in a fourth direction perpendicular to the third direction and opposite to the second direction, and it is determined whether the current location of the floor-cleaning robot is a secondary selectable area to be cleaned; if the current location of the floor-cleaning robot is a secondary selectable area to be cleaned, a cleaning operation is executed in the secondary selectable area to be cleaned. In the present disclosure, an area to be cleaned is selected by determining, multiple times, whether an area where the floor-cleaning robot is located is a secondary selectable area to be cleaned, and the floor-cleaning robot moves by a shorter unit distance, so that a better coverage of the area to be cleaned can be achieved, and the occurrence of omission of cleaning can be avoided.

It should be noted that the respective embodiments in this specification are described in a progressive manner, and each embodiment focuses on differences from other embodiments, and the same or similar parts between the respective embodiments can be referred from each other. The embodiments involving devices are described relatively simply due to their substantial similarity to the method embodiment, and the relevant parts can be seen in the description of the method embodiment.

In several embodiments according to the present disclosure, it should be understood that the disclosed device and method may also be implemented in other ways. The device embodiments described above are merely illustrative in nature. For example, the flowcharts and block diagrams in the drawings illustrate implementable architectures, functionalities, and operations of devices, methods and computer program products according to multiple embodiments of the present disclosure. In this regard, each block in the flowcharts or block diagrams may represent a module, a program segment, or a portion of code, wherein the module, the program segment, or the portion of code includes one or more executable instructions configured to implement a specified logical function(s). It should also be noted that in some alternative embodiments, the functions shown in the blocks may occur out of the order noted in the drawings. For example, two blocks shown in succession may in fact be executed substantially concurrently, or they may sometimes be executed in a reverse order, depending upon the functionality involved. It will also be noted that each block of the block diagrams and/or flowcharts, and combinations of blocks in the block diagrams and/or flowcharts, may be implemented by special purpose hardware-based systems that execute the specified functions or actions, or by a combination of special purpose hardware and computer instructions.

In addition, the individual functional modules in the respective embodiments of the present disclosure may be integrated together to form one independent part, or each of the modules may be stand-alone, or two or more of the modules may be integrated to form one independent part.

When implemented in the form of a software functional module and sold or used as an independent product, the functions may be stored in a computer-readable storage medium. Based on such understanding, the technical solution of the present disclosure essentially, or the part thereof contributing to the prior art, or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk. It should be noted that in this text, relationship terms such as first, second, and the like are used only for distinguishing one entity or operation from another entity or operation, while it is not necessarily required or implied that these entities or operations have any such practical relationship or order. Furthermore, the terms "comprise", "include", or any other variations thereof are intended to cover non-exclusive inclusions, such that a process, method, article, or apparatus that comprises a list of elements not only comprises those elements, but also comprises other elements not expressly listed or also comprises elements inherent to such process, method, article, or apparatus. Without more restrictions, an element defined with the wording "comprising a . . . " does not exclude the presence of additional identical elements in the process, method, article or apparatus comprising the element.

The above description is merely illustrative of preferred embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure. It should be noted that similar reference numerals and letters refer to similar items in the following figures. Thus, once a certain item is defined in one figure, it may not be further defined or explained in the following figures.

The above description is merely illustrative of specific embodiments of the present disclosure, but the scope of protection of the present disclosure is not limited thereto. Any variations or alternatives that can be readily envisaged by those skilled in the art within the technical scope disclosed in the present disclosure are intended to be encompassed in the scope of protection of the present disclosure. Therefore, the scope of protection of the present disclosure should be determined by the scope of protection of the claims.

Industrial Applicability

In the present disclosure, an area to be cleaned is selected by determining, multiple times, whether an area where the floor-cleaning robot is located is a secondary selectable area to be cleaned, and the floor-cleaning robot moves by a shorter unit distance, so that a better coverage of the area to be cleaned can be achieved, and the occurrence of omission of cleaning can be avoided.

What is claimed is:

1. A method for selecting an area to be cleaned, wherein the method comprises:
   obtaining a secondary selectable area to be cleaned, comprising: dividing the area to be cleaned into at least two sub-areas to be cleaned; classifying the at least two sub-areas to be cleaned into a large sub-area to be cleaned and a small sub-area to be cleaned according to sizes; acquiring a boundary line between the large sub-area to be cleaned and the small sub-area to be cleaned; and extending the boundary line into an extended boundary line and determining whether the extended boundary line divides the large sub-area to be cleaned, wherein if yes, a first sub-area to be cleaned that is located on a same side of the boundary line as the small sub-area to be cleaned, and a second sub-area to be cleaned that is located on a different side of the boundary line from the small sub-area to be cleaned are acquired; establishing a communication relationship between the small sub-area to be cleaned and the first sub-area to be cleaned, and establishing a communication relationship between the small sub-area to be cleaned and the second sub-area to be cleaned; and using the first sub-area to be cleaned, the second sub-area to be cleaned, and the small sub-area to be cleaned as at least three secondary selectable area to be cleaned; and
   controlling a floor-cleaning robot to move by one unit length in a first direction, and determining whether a current location of the floor-cleaning robot is the secondary selectable area to be cleaned, wherein
   if not, controlling the floor-cleaning robot to move by one unit length in a second direction perpendicular to the first direction and determining whether the current location of the floor-cleaning robot is the secondary selectable area to be cleaned, wherein if not, controlling the floor-cleaning robot to move by two unit lengths in a third direction perpendicular to the second direction and opposite to the first direction and determining whether the current location of the floor-cleaning robot is the secondary selectable area to be cleaned, wherein if not, controlling the floor-cleaning robot to move by two unit lengths in a fourth direction perpendicular to the third direction and opposite to the second direction and determining whether the current location of the floor-cleaning robot is the secondary selectable area to be cleaned; and executing a cleaning operation in the secondary selectable area to be cleaned if the current location of the floor-cleaning robot is the secondary selectable area to be cleaned.

2. The method according to claim 1, wherein the method further comprises:

determining whether one or more uncleaned areas are present in a region communicating with a current area, if a cleaning of the current area is completed, wherein if yes, determining whether the current area is the small sub-area to be cleaned, wherein if yes, selecting an area with a smallest size from the uncleaned areas communicating with the current area, to be cleaned.

3. The method according to claim 2, wherein after determining whether the current area is the small sub-area to be cleaned, the method further comprises:

selecting, from the uncleaned areas communicating with the current area, a nearest area to be cleaned, if the current area is not the small sub-area to be cleaned.

4. The method according to claim 3, wherein the dividing the area to be cleaned into at least two sub-areas to be cleaned comprises:

establishing a mapping relationship between the area to be cleaned and a grid map;

acquiring a certain uncleaned grid in the area to be cleaned, using the grid as a seed point, and using an area where the seed point is located as the first sub-area to be cleaned;

acquiring a column where the seed point is located, and determining whether the column where the seed point is located has an uncleaned grid corresponding to the grid map, and if yes, adding the grid to the first sub-area to be cleaned;

acquiring an adjacent column adjacent to a current column, and determining whether the adjacent column has an uncleaned grid corresponding to the grid map, and if yes, adding the grid to the first sub-area to be cleaned; and repeating the steps of acquiring the adjacent column adjacent to the current column, and determining whether the adjacent column has the uncleaned grid corresponding to the grid map, and if yes, adding the grid to the first sub-area to be cleaned until no uncleaned grid is present, so as to complete an establishment of the first sub-area to be cleaned.

5. The method according to claim 2, wherein after determining whether one or more uncleaned areas are present in a region communicating with the current area, the method further comprises:

returning to a previous area previous to the current area and using the previous area as a new current area if not uncleaned area is present in the region communicating with the current area.

6. A non-transitory computer readable storage medium carrying one or more sequences of instructions, wherein execution of the one or more sequences of instructions by one or more processors causes the one or more processors to perform the steps of:

obtaining a secondary selectable area to be cleaned, comprising: dividing the area to be cleaned into at least two sub-areas to be cleaned; classifying the at least two sub-areas to be cleaned into a large sub-area to be cleaned and a small sub-area to be cleaned according to sizes; acquiring a boundary line between the large sub-area to be cleaned and the small sub-area to be cleaned; and extending the boundary line to form an extended boundary line and determining whether the extended boundary line divides the large sub-area to be cleaned, wherein if yes, a first sub-area to be cleaned that is located on a same side of the boundary line as the small sub-area to be cleaned, and a second sub-area to be cleaned that is located on a different side of the boundary line from the small sub-area to be cleaned are acquired; establishing a communication relationship between the small sub-area to be cleaned and the first sub-area to be cleaned, and establishing a communication relationship between the small sub-area to be cleaned and the second sub-area to be cleaned; and using the first sub-area to be cleaned, the second sub-area to be cleaned, and the small sub-area to be cleaned as at least three secondary selectable area to be cleaned; and controlling a floor-cleaning robot to move by one unit length in a first direction, and determining whether a current location of the floor-cleaning robot is the secondary selectable area to be cleaned, wherein if not, controlling the floor-cleaning robot to move by one unit length in a second direction perpendicular to the first direction and determining whether the current location of the floor-cleaning robot is the secondary selectable area to be cleaned, wherein if not, controlling the floor-cleaning robot to move by two unit lengths in a third direction perpendicular to the second direction and opposite to the first direction and determining whether the current location of the floor-cleaning robot is the secondary selectable area to be cleaned, wherein if not, controlling the floor-cleaning robot to move by two unit lengths in a fourth direction perpendicular to the third direction and opposite to the second direction and determining whether the current location of the floor-cleaning robot is the secondary selectable area to be cleaned; and executing a cleaning operation in the secondary selectable area to be cleaned if the current location of the floor-cleaning robot is the secondary selectable area to be cleaned.

* * * * *